United States Patent [19]

LeBlond

[11] Patent Number: 4,512,079
[45] Date of Patent: Apr. 23, 1985

[54] METHOD AND APPARATUS FOR INDEXING SHEET MATERIAL

[75] Inventor: Claude W. LeBlond, Enfield, Conn.

[73] Assignee: Gerber Garment Technology, Inc., South Windsor, Conn.

[21] Appl. No.: 515,638

[22] Filed: Jul. 21, 1983

[51] Int. Cl.³ ............................................. B65H 17/36
[52] U.S. Cl. ....................................... 33/1 M; 226/8; 226/162; 346/136
[58] Field of Search .................... 33/1 D, 1 M; 226/8, 226/33, 150, 162; 346/136

[56] References Cited

U.S. PATENT DOCUMENTS

| | | | |
|---|---|---|---|
| 3,844,461 | 10/1974 | Robinson et al. | 33/1 M |
| 4,091,980 | 5/1978 | Gerber | 226/162 |
| 4,131,224 | 12/1978 | Gerber et al. | 226/8 |
| 4,133,111 | 1/1979 | Logan | 33/1 M |
| 4,400,704 | 8/1983 | Brown et al. | 346/136 |

FOREIGN PATENT DOCUMENTS 1010449  6/1957  Fed. Rep. of Germany ........ 226/33

Primary Examiner—Richard R. Stearns
Attorney, Agent, or Firm—McCormick, Paulding & Huber

[57] ABSTRACT

In a plotter, an elongated strip of plotting paper extends between rolls at opposite ends of a plotting table to receive graphic information from a plotting instrument that is carried over the table by means of a motor controlled carriage. Different segments of the elongated strip are shifted onto the work surface of the table to receive the graphic information by coupling the strip to the plotting carriage and moving the carriage together with the strip across the table in an indexing operation. To prevent distortion of the material and associated positioning errors during the step of indexing, the material being pulled onto the table by the carriage is placed in tension and the material being discharged from the table is maintained substantially tension-free.

13 Claims, 5 Drawing Figures

METHOD AND APPARATUS FOR INDEXING SHEET MATERIAL

BACKGROUND OF THE INVENTION

The present invention relates to material handling machines and is particularly applicable to plotters in which elongated strips of sheet material must be accurately indexed across a plotting table during a series of plotting operations.

Problems associated with accurately indexing elongated strips of limp sheet material, such as paper, over a work surface that is relatively short compared to the length of the strip are well known in the art. U.S. Pat. Nos. 3,844,461 and 4,131,224 describe mechanisms utilized in plotters for accurately indexing the material so that a continuous plot can be produced along a strip of plotting material without discontinuities between sections that are plotted before and after an indexing operation. It is well known that strips of sheet material do not move precisely along a track between a feed roll and a take-up roll on which the strips are wound. The strips tend to shift laterally of the track in an irregular manner unless additional controls over the lateral movements are provided. The positioning problem is controlled in the above-referenced patents by coupling the strip of sheet material directly to the same carriage that carries the plotting tool and then shifting the strip by means of the carriage. In this manner, there is precise correspondence between both the longitudinal and lateral positioning of the plotting instrument and the strip of material at the junction between portions of the plot made before and after the indexing operation.

It has been determined, however, that even with the indexing method described in the above-referenced patents, positioning errors may arise from tension that remains in the strip of material on the table after the indexing operation is complete. For example, when the strip of material is released from the plotting carriage, residual stress or tension in the paper may shift the strip from the position in which the material was placed by the carriage.

It is accordingly a general object of the present invention to provide a method and apparatus for indexing limp sheet material with accuracy and without the errors arising from residual tension and stresses in the material that occur in the prior art.

SUMMARY OF THE INVENTION

The present invention resides in a method and apparatus for indexing generally elongated strips of sheet material, such as a plotting paper, over a surface on which a work operation is performed by an instrument, such as a plotting head. The apparatus, which also performs the method, comprises a work table with a generally flat work surface on which the sheet material is supported during a work operation. A work carriage carrying an instrument, such as a plotting pen or pencil, is mounted for movement back and forth over the support surface in a given direction to enable the instrument to perform work operations on the material at selected locations over the table.

A material advance mechanism is provided for indexing the material in segments over the support surface, and moves the material from a feed position at one end of the table to a discharge position at the opposite end. In this manner, continuous work can be produced on consecutive segments of the material which may have a total length many times greater than the length of the table on which the work is performed. The advance mechanism includes coupling means that is operatively associated with the work carriage for engaging the material with the carriage and moving the material in the given direction with the same accuracy and positioning as that of the instrument mounted on the carriage. Tensionless receiving means are associated with the discharge position of the table for receiving the material discharged from the surface by the advance mechanism without tension or distortion. The tension free material is clamped to the work surface by a clamping bar before the material is disengaged from the work carriage after an indexing operation.

With the invention, continous plots that extend from one segment of the material to another can be prepared without having discontinuities between the one portion of the plot produced prior to an indexing operation and another portion of the plot produced after the operation. The elimination of tension in the discharged sheet material is advantageous because any such residual tension may shift the sheet material on the work surface of the table after the material has been indexed and released from engagement with the work carriage. Therefore, by maintaining the material tension-free at the discharge end of the table, positioning errors attributable to the indexing operation are minimized to further improve accuracy during plotting or other work operations performed by the instrument.

DESCRIPTION OF PREFERRED EMBODIMENTS

Figure 1:
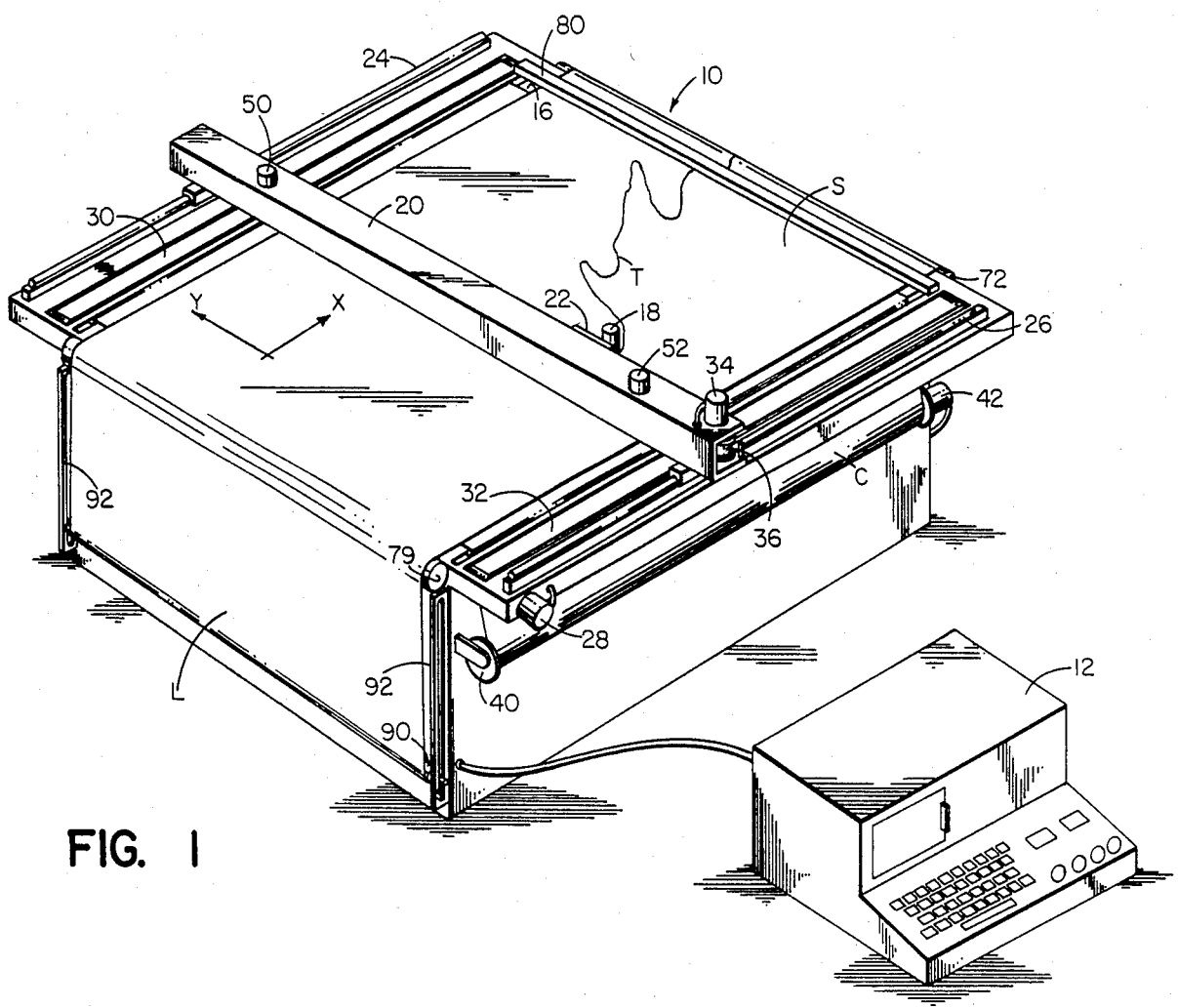
FIG. 1 is a perspective view of an automatically controlled plotter in which the present invention is embodied and performed.

FIG. 1 illustrates an automatically controlled plotting system that is comprised basically of a plotter, generally designated 10, and a plotter control 12, which may take the form of a microprocessor. Automatically controlled plotting systems of this type have been sold commercially for many years and are well known as exemplified by U.S. Pat. No. 4,131,224 filed by Gerber and Logan. The controller 12 includes an internal program that controls the basic functions of the plotter 10, and also receives data in the form of a disk, tape, or other memory device in which graphic information comprising the plot is defined.

The plotter 10 is comprised basically of a table 14 having an upwardly disposed work surface 16 on which a strip of plotting material S is supported in the course of a plotting operation while a plotting head or instrument 18 is moved over the surface by means of an X-carriage 20 and a Y-carriage 22 to produce a line trace T on the material. The material typically employed is a lay-flat bond paper having a thickness in the range of three to five thousandths of an inch. Such paper may be mechanically engaged and indexed across the table and has sufficient internal rigidity that short segments of five feet or more may be pushed off the appropriately smoothed and prepared surface of the table without buckling. The work surface 16, for example, may be the upwardly facing support surface of a fiberboard that is covered with a thin layer of tetraflouroethylene impregnated in fiberglass.

Movement of the X-carriage 20 in the illustrated X-coordinate direction relative to the table 14 is provided by round ways 24, 26 at opposite sides of the table and is produced by means of an X-servomotor 28 and a pair of toothed drive belts 30, 32 which engage opposite ends of the carriage respectively and are driven by the servomotor through a torque shaft and pulley arrangement (not visible) within the table. The Y-carriage 22 is mounted on the X-carriage 20 for movement in the illustrated Y-coordinate direction, and the carriage is moved by means of a Y-servomotor 34 mounted on the X-carriage 20 and a single, toothed drive belt 36 that extends along the X-carriage 20. Command signals from the controller 12 operate the servomotors 28 and 34 to move and position the plotting instrument 18 over the work surface 16, and additional commands cause the plotting instrument 18 to be engaged or disengaged with the strip of material S to produce graphic information, such as the line trace T, at selected locations during the movement.

The graphic information plotted can represent a wide variety of subjects. The information may be a large mechanical drawing, a wiring diagram, a flow chart, a pattern marker, or any other object.

In order to improve the visibility of the plot or to prepare the plot for duplication by mimeograph, xerography, or other processes, a strip of carbon paper C is mounted on storage rolls 40 (only one visible) at opposite lateral sides of the table and extends transversely under the strip S of plotting material from one side of the table 14 to the other. The carbonized surface faces upwardly and therefore, is in adjacent relationship with the underside of the plotting paper S. With a mechanical plotting instrument, such as a pencil or stylus, which is pressed against the plotting paper, the carbonized material is transferred to the underside of the plotting material and produces a highly visible negative of the plot that is suitable for reproduction. The carbon paper C may be advanced incrementally or continuously at a slow speed by a motor 42 so that fresh carbonized material is constantly being introduced under the plotting material.

In order to bring new segments of the plotting material S onto the surface 16 of the plotting table 14, the X-carriage 20 carries at its opposite ends solenoid actuated couplings 50, 52 which engage the longitudinal edges of the material S and permit the X-carriage 20 to pull the strip of material from a feed position at the one end of the table where the X-servomotor 28 is located toward a discharging position at the opposite end of the table. At the appropriate time in the course of the plotting operation, the carriage 20 is moved to the feed position at the one end of the table, the couplings 50, 52 are actuated to couple the plotting material to the carriage 20 and then the carriage is driven by means of the servomotor 28 toward the discharge position at the opposite end of the table, and at the same time, pulls a new segment of the plotting material onto the work surface 16. A clamping bar 80, described in greater detail below, extends transversely across the plotting table 14 at the discharge end and is energized to hold the strip of sheet material against the work surface when plotting is resumed. The carriage couplings 50, 52 are de-energized, and the X-carriage 20 is then free to continue the plotting operation in conjunction with the Y-carriage 22 and the plotting instrument 18.

Figure 2:
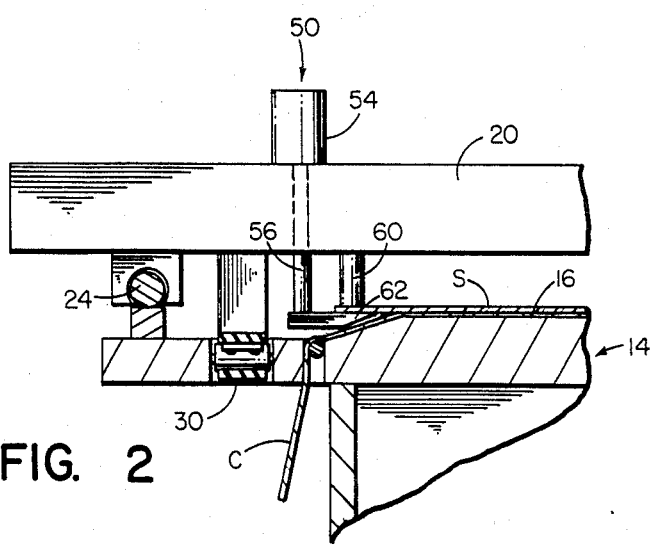
FIG. 2 is a fragmentary horizontal elevation view of the plotting carriage and table at one side.

FIG. 2 illustrates one embodiment of the coupling 50 that can be employed for coupling the strip of plotting material S to the X-carriage 20. The coupling is comprised by a solenoid 54 mounted on the carriage 20 with a movable armature 56 extending downwardly through the carriage to a position slightly below the elevated work surface 16 of the table 14. A clamping post 60 fixedly secured to the underside of the carriage extends downwardly to a position immediately above the work surface and the plotting material S resting on the surface. A clamp member 62 connected to the lower end of the movable armature 56 projects under the plotting paper and the post 60 so that the paper is clamped between the member and the post when the solenoid 54 is actuated. At that point, the carriage 20 and the plotting paper S may move as an integral unit over the work surface 16, and during movement there is no change in the positional relationship of the plotting paper, the X-carriage 20, and the plotting instrument 18 and therefore the plot in theory may be continued from one segment of the plotting material to the other without any apparent discontinuity.

Figure 3:
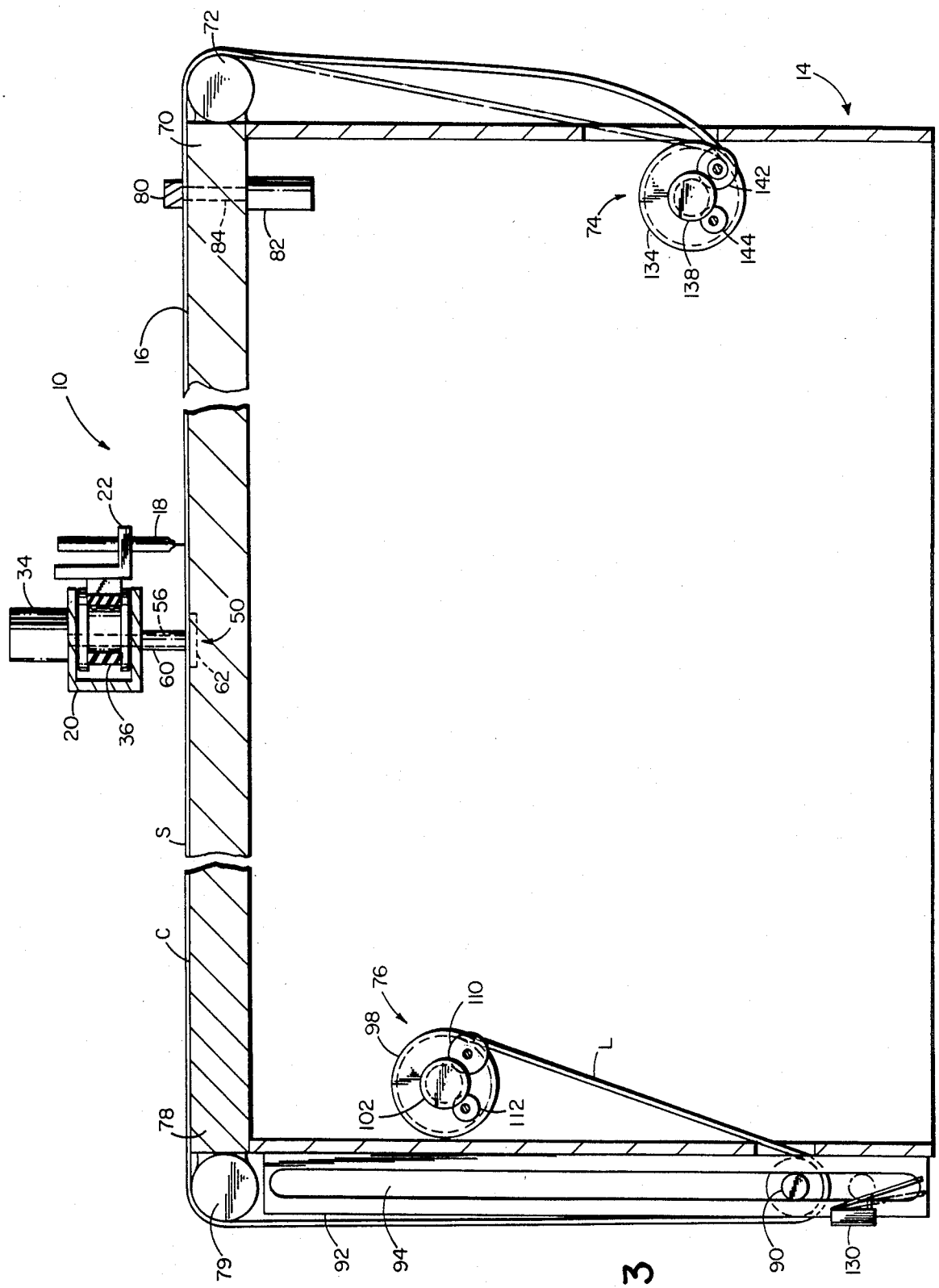
FIG. 3 is a horizontal side elevation view of the plotter in a schematic form and shows the principal components for indexing the sheet material on the plotting table.

In accordance with the present invention, continuity of the plot and other graphic material is further ensured by advancing the sheet material S across the work surface 16 of the table 14 in a tensionless manner between the carriage couplings 50 and the discharge end 70 of the table, as shown in FIG. 3. At the discharge end, the sheet material S passes over a smooth, rounded lip 72 and falls freely under its own weight toward a receiver in the form of a take-up roll 74 mounted below the table surface 16. As shown in FIG. 3, the sheet material S is in a slack condition between the lip 72 and the roll, which is typical during an indexing operation before the roll 74 takes up the slack. The advantage of indexing the material off of the discharging end 70 of the table 14 toward a material receiver, such as the roll 74, in a tension-free manner, is that the paper is not distorted by such tension and therefore, cannot develop wrinkles or stresses that would tend to shift the paper on the support surface 16 during or after indexing. For example, if the clamp member 62 is disengaged from the sheet material S at the discharging end of the table, any residual stress in the material might cause the entire sheet spanning the support surface 16 to shift slightly relative to the surface when the stress is relieved. In that event, a plot that had been prepared on the segment of the material moved off the discharging end would not register precisely with a continuation of that plot produced by the plotting instrument 18 upon resumption of the plotting operation. By eliminating any such stresses in free-falling material, there is less opportunity for unwanted stresses to develop and displace the new segment of material that is pulled accurately onto the support surface by the carriage 20 from a feed roll 76 at the feed end 78 of the table.

To further assist in holding the sheet material in the properly indexed position, the clamp bar 80 is supported over the surface 16 by means of two solenoids 82 and associated armatures 84 at opposite sides of the table 14. While a new segment of sheet material S is being pulled onto the support surface 16, the solenoids 82 are deactuated and the clamp bar 80 is elevated above the surface and out of contact with the material. Thus the material is indexed under the bar and falls freely off the discharging end in a tension-free manner, but when the new segment is in position on the table, the solenoids 82 pull the clamp bar downwardly and clamp the material firmly in position on the table. In the subsequent plotting operation, therefore, any displacement of the sheet material from its tension-free position is prevented.

Although the material being moved off of the table is tension-free, the material pulled onto the table by the carriage 20 and couplings 50 is held in tension in order to control its position. For this purpose, the material S is fed from the feed roll 76 in a loop L under a dancer bar 90 and then fed upwardly from the bar over a rounded lip 79 onto the support surface 16 at the feed end 78 of the table. The dancer bar 90 is mounted at opposite sides of the table in guide plates 92 which have elongated vertical slots for holding the bar and guiding the bar in a vertical plane as the loop L of material is pulled onto the table.

Figure 4:
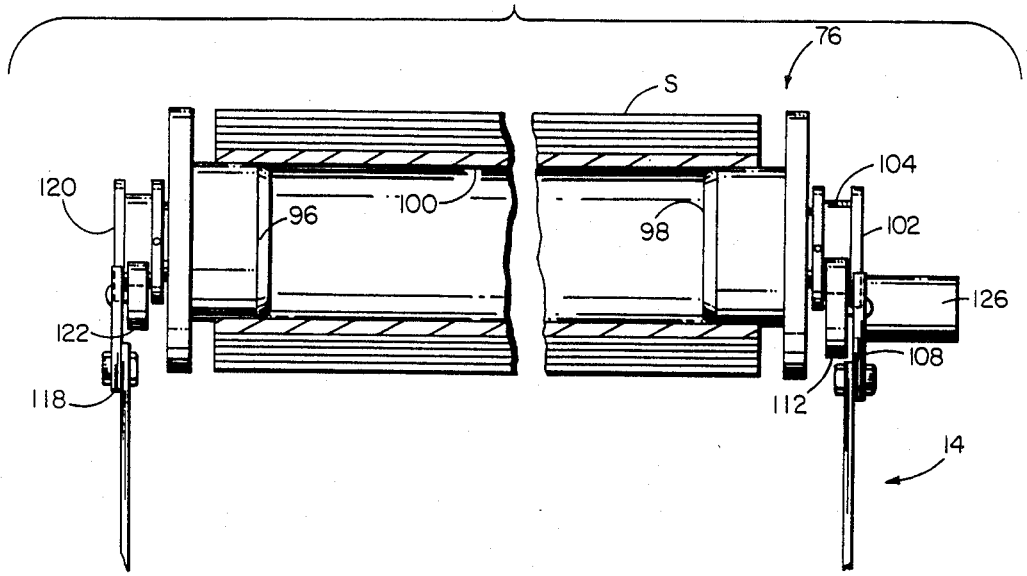
FIG. 4 is a longitudinal cross section of the feed roll on which one end of the strip of plotting material is stored.
Figure 5:
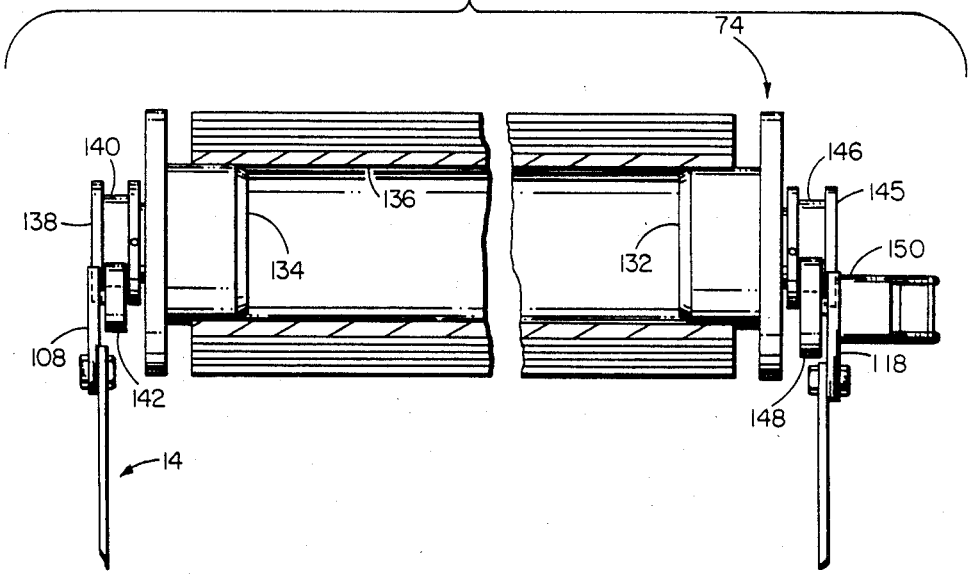
FIG. 5 is a longitudinal cross section of the take-up roll on which the opposite end of the strip of plotting material is received.

The feed roll 76 as shown in FIGS. 3 and 4 has two end caps 96, 98 that are tapered and fit snugly within a sleeve 100 on which the sheet material S is wound. The sleeve 100 may be a cardboard tube on which the material S is supplied, or the material may be wound onto the sleeve for use in the plotter.

Fixedly connected to the outer face of the end cap 98 is a roller 102 with a central circumaxial guide groove 104. To rotatably support the end cap 98 in a lateral frame member 108 of the table 14 and to permit easy loading and unloading of the feeder roll 76, two rollers 110 and 112 are positioned in the groove 104 in bracing relationship under the roller 102 at approximately 60° from the vertical plane as shown in FIG. 3. The axial width of the rollers 110, 112 and the width of the groove 104 are approximately equal so that the rollers establish a transverse position for the feed roll 76 of sheet material within the table.

The cap 96 at the opposite end of the feed roll 76 is supported as shown in FIG. 4 from the lateral frame member 118 in a similar manner by a grooved roller 120 and a pair of freely rotatable rollers 122 (only one visible).

In the preferred embodiment of the invention, the support rollers 110 and 112 shown in FIGS. 3 and 4 are not freely rotatable. The roller 112 is mounted on the shaft of an electrically actuated disk brake 126 so that the roller can be stopped on command and stop the rotation of the feed roll 76. For this reason, the roller 112 is preferably made from a urethane polymer or other rubber-like material to provide a high coefficient of friction between the roller and the grooved roller 102.

Additionally, the roller 110 made of material such as plastic may be fixed against rotation in order to provide a slight drag on the feed roll 76 to thereby prevent the rotational inertia of the feed roll 76 from paying out too much of the sheet material. In such a case, the dancer bar 90 in the loop L of the sheet material would reach the bottom of the slot 94 and remove all tension in the loop L.

It will be understood that with drag imposed on the feed roll, the dancer bar 90 effectively places tension on that portion of the material within the loop L and extending onto the feed end 78 of the table. To control the tension and ensure that the loop L is maintained during an indexing operation, a limit switch 130 is mounted on the plate 92 near the lower end of the slot 94. The switch is connected in controlling relationship to the brake 126, and is actuated by the dancer bar 90 to apply the brake when the loop L is large and extends close to the lower end of the slot. Thusly, the dancer bar 90 and the brake 126 serve as an accumulator that provides a quantity of sheet material sufficient to be pulled onto the support surface 16 of the table 14 by the carriage 20 as the brake 126 releases and supplies additional material from the feed roll 76. At the same time, the dancer bar maintains tension on the portion of the material being pulled onto the table so that the material lies flat on the support surface and is guided evenly over the rounded lip 79 without drifting laterally from one side of the table to the other.

The take-up roll 74 is constructed and supported adjacent the discharging end 70 of the table 14 in a manner similar to the feed roll 76. The roll 74 includes end caps 132, 134 that are tapered and fit snugly within a sleeve 136 on which the sheet material is wound. Like the sleeve 100, the sleeve 136 may be made of cardboard or other material, and preferably the sleeves are the same diameter so that they are interchangeable.

A roller 138 is fixedly connected with the outer face of the cap 134 and includes a circumaxial groove 140. A pair of supporting rollers 142, 144 (FIGS. 3 and 4), rotatably mounted in the lateral frame member 108, underlie the roller 138 and have a width slightly less than the width of the groove 140 to provide lateral guidance to the take-up roll 74.

The opposite end cap 132 includes a fixed roller 145 with a circumaxial groove 146, and a pair of rollers 148 (only one visible) underlie the roller 145 in the groove 146 for support from the lateral frame member 118. One of the rollers 148 is mounted on the shaft of a drive motor 150 and may be made from a urethane polymer to frictionally engage the roller 145 and the take-up roll 74 in driving relationship. In the preferred embodiment of the invention, the drive motor is energized continuously, and turns the roller 148 at a relatively slow speed to take up slack in the strip of sheet material (as shown in solid line) that has been fed off of the support surface 16 and is received on the take-up roll. The speed of the drive motor is set or adjusted to be less than that of the carriage 20 during an indexing operation so that the sheet material does not remain in tension (as shown in phantom) during the indexing operation. By the time that all of the slack has been taken up on the roll 74, the clamp bar 80 has been actuated and holds the sheet material firmly against the support surface 16. Consequently, the drive motor 150 continues to turn the roller 148, but due to insufficient friction and slippage, does not turn the take-up roll 74 and does not produce any tension in that portion of the material on the support surface between the clamping bar 80 and the carriage 20. Hence, the drive motor 150 does not distort or shift the material on the table prior to or during a plotting operation.

A typical indexing operation takes place as follows. When plotting on one segment of the sheet material S is completed and while the clamp bar 80 is holding the sheet material firmly against the support surface 16, the tool carriage 20 is translated to a position adjacent the feed end 78 of the table 14 with the plotting instrument elevated above the material in a non-plotting position.

The couplings 50 and 52 are then actuated and engage the sheet material with the carriage 20 without lifting or distorting the material above the support surface. The position of the carriage 20 at this point in time corresponds approximately with any breaks or interruptions in the graphic data being plotted on the segment of material then lying on the support surface of the table.

The clamp bar 80 then releases the sheet material from the support surface, and it is assumed that all slack in the discharged material has been taken up on the roll 74. At this point, any tension applied to the segment of material between the carriage 20 and the take-up roll 74 is inconsequential because the couplings 50, 52 firmly hold the sheet material and prevent any unbalanced stresses or distortion in the material between the discharge end 70 and the carriage from reaching that segment of the material between the carriage and the feed end 78.

The automatic controller 12 then causes the X-carriage 20 to move from the feed end 78 to the discharge end and to pull a new segment of sheet material S onto the support surface 16. During movement, the segment of material between the carriage and the take-up roll 74 is not in tension because the carriage 20 translates toward the discharge end 70 at a rate faster than the drive motor 150 retrieves the displaced segment on the take-up roll 74. Under these circumstances, sheet material, such as a plotting paper having a three to five thousandths thickness, has sufficient rigidity that segments up to five feet or more can be pushed slidably over the support surface 16 and fall freely downward from the discharge lip 72 under its own weight. Although the weight of the material may apply a slight tension at the lip 72, the displacement of the material on the table is, for all practical purposes, tension free because of friction at the support surface and at the lip 72.

At the same time that the carriage 20 is moving a tension free segment off of the support surface 16, it is pulling a new segment of material onto the surface under tension created by the dancer bar 90. Assuming that the bar initially has dropped to a position indicated in phantom at the lower end of the slot 94, the brake 126, shown in FIG. 4, holds the feed roll 76, and the weight of the bar places tension on that segment of the material between the bar and the carriage 20. As the carriage begins to move from the feed end 78 to the discharge end 70 of the table in an indexing operation, the material in the loop L is pulled upwardly toward the support surface 16 and the dancer bar is lifted above the limit switch 130. At that point, the brake is released and the feed roll 76 is free to rotate and pay out sheet material into the loop L. Depending upon the size of the loop, the length of the segment pulled onto the table, and the speed at which the tool carriage 20 moves, the size of the loop L may vary and the bar 90 may move up and down in the slot 94 before a full segment of material has been indexed.

As the X-carriage 20 approaches a particular position along the support surface 16 adjacent the clamp bar 80 at the discharge end 70 of the table, the carriage stops, then the clamp bar 80 is pulled down and clamps the tension free segment of material against the support surface 16 before all of the slack in the material is taken up on the roll 74. At the same time, the dancer bar 90 pulls downwardly on the loop L until it reaches the phantom position adjacent the limit switch 130, and at that point, the brake is applied to the feed roll 76. Tension produced by the dancer bar remains in the segment of the strip between the bar and the carriage 20 and holds the sheet material flat on the support surface 16. The couplings 50, 52 on the tool carriage are then disengaged from the material and with a new segment of material on the table, the plotting operation is resumed.

The indexing operations continue alternately with plotting operations until a complete plot that is substantially longer than the length of the plotting table is finished. In each indexing operation, the same sequence of steps is followed and at the end of the last plotting operation, the strip of material bearing the plot is on the portion of the strip lying on the table and wound onto the take-up roll 74.

In summary, the plotter 10 makes a continuous plot on a strip of sheet material that is sequentially indexed as the plot is developed on successive segments of the material. Accurate indexing is achieved by allowing the sheet material to fall freely in a tensionless fashion from the plotting table while tension is maintained in the material drawn onto the table.

While the present invention has been described in a preferred embodiment, it should be understood that numerous modifications and substitutions can be had without departing from the spirit of the invention. It will be noted that one advantage of the embodiment disclosed is that the system is self-regulating and no command signals from the controller 12 are required to any of the material handling mechanisms other than the couplings 50, 52 on the tool carriage. The remaining components are self regulated or continuously operative. Of course, control signals from the controller could be applied to the drive motor 150 if intermittent operation were desired. The particular work operation performed by the tool carriage 20 is not limited to plotting and, therefore, tools other than a plotting instrument may be involved. The supporting mechanisms and rollers for the feed roll 76 and the takeup roll 74 permit rapid changes of plotting paper, but other support structures and means for journaling the rolls are possible. The clamp members 60, 62 that engage the plotting material are merely exemplary, and other such mechanisms in U.S. Pat. Nos. 3,844,461, 4,091,980, and 4,131,224, all assigned to The Gerber Scientific Instrument Company, can be employed. Accordingly, the present invention has been described in a preferred embodiment by way of illustration rather than limitation.

I claim:

1. An automatically controlled instrument system comprising:
   a work table with a flat support surface on which a sheet of material rests during a work operation,
   a work carriage carrying an instrument and mounted for movement over the support surface in a given direction to enable the instrument to perform work operations on the material at selected locations over the table;
   a material advance mechanism for indexing the material over the support surface in the given direction from a feed position at one end of the table to a discharge position at the opposite end of the table whereby continuous work can be produced on consecutive segments of material having a total length greater than the length of the table in the given direction, the advance mechanism including coupling means operatively associated with the work carriage for engaging the material, and control means for moving the carriage, the coupling means, and the engaged material in the given direction across the support surface from the feed position toward the discharge position at a controlled speed and further including tensionless receiving means associated with the discharge position of the table for receiving the material discharged from the support surface by the advance mechanism without tension or distortion, the receiving means including a take-up roll onto which the material is wound from the table, and a take-up drive motor connected in driving relationship with the take-up roll and operated at a speed less than the controlled speed of the work carriage and engaged material to receive the material on the take-up roll from the support surface in a tensionless condition.

2. An automatically controlled instrument system as defined in claim 1 wherein the tensionless receiving means comprises a material take-up roll and control means energizing the roll to remove slack from the material after the material has been indexed.

3. An automatically controlled instrument system as defined in claim 1 wherein the take-up drive motor is connected in driving relationship with the take-up roll through a friction drive mechanism, the motor being continuously energized and the friction drive mechanism allowing slippage when all slack in the material between the roll and the table is taken up on the roll.

4. An automatically controlled instrument system as defined in claim 1 further including clamp means located adjacent the discharge position of the work table toward which the material advances for clamping the material against the table after movement.

5. An automatically controlled instrument system as defined in claim 1 further including tensioning means associated with the feed position at the one end of the table for maintaining tension in the portion of the sheet material pulled onto the support surface at the feed position by the material advance mechanism.

6. An automatically controlled instrument system as defined in claim 5 wherein:
a rotatable feed roll is provided adjacent the feed position of the table for storing the sheet material in a strip; and
the tensioning means comprises braking means connected with the feed roll for limiting roll rotation and the amount of material taken from the feed roll during an indexing operation.

7. An automatically controlled instrument system as defined in claim 6 wherein the tensioning means further includes an accumulator holding the segment of sheet material in a variable depth loop between the feed roll and the feed position of the table, the accumulator having a dancer bar resting in the loop for placing the portion of the plotting material pulled onto the support surface in tension.

8. An automatically controlled instrument system as defined in claim 7 wherein switch means responsive to the depth of the loop of material controls the braking means connected with the feed roll.

9. A method of indexing an elongated strip of limp sheet material over a work surface from a feed end to a discharge end by means of an automatically controlled work carriage that alternately performs work on a segment of the material on the surface and then engages and moves the material between the ends to bring another segment onto the surface wherein the improvement comprises the steps of:
maintaining tension in the one portion of the strip extending between the feed end of the surface and the work carriage during movement of the material by the carriage at a controlled speed; and simultaneously
maintaining the other portion of the strip extending from the work carriage to the discharge end substantially tension free by receiving the strip of material on a take-up roll and driving the take-up roll at a speed less than the controlled speed of the carriage.

10. A method of indexing an elongated strip of limp sheet material as defined in claim 9 wherein the step of maintaining the other portion tension free comprises allowing the strip of limp sheet material to fall freely from the discharge end of the work surface under its own weight between the end of the work surface and the take-up roll.

11. A method of indexing an elongated strip of limp sheet material, as defined in claim 9, further including the step of
clamping the tension free portion of the strip of sheet material to the work surface after a segment has been brought onto the work surface by the carriage.

12. A method of indexing an elongated strip of sheet material as defined in claim 11 including the steps of
engaging the strip of limp sheet material with the work carriage and then indexing the material over the work surface while maintaining the tensioned and tension free portions to move a new segment of the strip onto the surface,
disengaging the strip of sheet material from the carriage after the new segment is on the work surface and wherein
the step of clamping is performed after the step of indexing and before the step of disengaging.

13. A method of indexing as in claim 12 further including
re-engaging the strip of limp sheet material with the work carriage after a work operation on one segment of the strip for moving another segment onto the work surface; and
unclamping the strip from the work surface only after the strip is re-engaged with the carriage.

* * * * *